United States Patent
Poteet et al.

(10) Patent No.: US 12,332,180 B2
(45) Date of Patent: Jun. 17, 2025

(54) ANTIMICROBIAL SURFACE COATING FORMATION, DETECTION, QUANTIFICATION AND REACTIVATION SYSTEMS AND METHODS

(71) Applicant: B/E Aerospace, Inc., Winston-Salem, NC (US)

(72) Inventors: Steven Poteet, Ashland, MA (US); Thomas Martz, Winston-Salem, NC (US); Bradford D'Alessio, Winston-Salem, NC (US); David C. McConnell, N. Ireland (GB); Vijay V. Pujar, Rancho Santa Fe, CA (US); Katherine Urena Pimentel, Manchester, CT (US); Irene Rexwinkle, Mill Creek, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 1020 days.

(21) Appl. No.: 17/366,626

(22) Filed: Jul. 2, 2021

(65) Prior Publication Data
US 2021/0404970 A1    Dec. 30, 2021

Related U.S. Application Data

(63) Continuation-in-part of application No. 17/071,781, filed on Oct. 15, 2020, now Pat. No. 11,536,662.
(Continued)

(51) Int. Cl.
*G01N 21/78* (2006.01)
*A01N 33/12* (2006.01)
*G01N 21/64* (2006.01)

(52) U.S. Cl.
CPC ............. *G01N 21/78* (2013.01); *A01N 33/12* (2013.01); *G01N 21/643* (2013.01); *G01N 2021/6439* (2013.01)

(58) Field of Classification Search
CPC ............. C09D 7/61; G01N 2021/6497; G01N 2021/8427; G01N 2021/8433;
(Continued)

(56) References Cited

U.S. PATENT DOCUMENTS

| | | | |
|---|---|---|---|
| 2,449,274 A | 9/1948 | Broll | |
| 4,311,479 A * | 1/1982 | Fenn | ..................... D06M 23/00 424/404 |

(Continued)

FOREIGN PATENT DOCUMENTS

| | | |
|---|---|---|
| BR | PI0905679 A2 | 7/2015 |
| CA | 2647311 C | 8/2014 |

(Continued)

OTHER PUBLICATIONS

Derk te Winkel, J. Frontiers in Cell and Developmental Biology. vol. 4, Article 29, Apr. 13, 2016, pp. 1-10.*
(Continued)

*Primary Examiner* — Maureen Wallenhorst
(74) *Attorney, Agent, or Firm* — Suiter Swantz IP

(57) ABSTRACT

Disclosed are methods for detecting an antimicrobial surface coating on a substrate including the steps of applying an anionic agent to a surface of the substrate, allowing the anionic agent to bond to antimicrobial surface coating present on the substrate, removing unbonded anionic agent, subjecting the surface of the substrate to a predetermined process to effect a change in the bonded anionic agent, observing the change, and verifying, based on the observed change, the presence of antimicrobial surface coating on the substrate. Further disclosed are antimicrobial surface coat-
(Continued)

ing solutions, methods for their application, and methods for reactivated antimicrobial surface coatings.

8 Claims, 13 Drawing Sheets

Related U.S. Application Data

(60) Provisional application No. 63/085,774, filed on Sep. 30, 2020, provisional application No. 63/085,794, filed on Sep. 30, 2020, provisional application No. 63/085,830, filed on Sep. 30, 2020, provisional application No. 63/085,735, filed on Sep. 30, 2020, provisional application No. 63/062,855, filed on Aug. 7, 2020, provisional application No. 63/048,600, filed on Jul. 6, 2020, provisional application No. 63/043,661, filed on Jun. 24, 2020.

(58) Field of Classification Search
CPC ... G01N 2021/6439; G01N 2021/7786; G01N 21/6428; G01N 21/643; G01N 21/6447; G01N 21/8422; G01N 21/78; A01N 33/12
USPC ........ 514/642; 436/164, 166, 172, 149, 151, 436/147; 422/82.05, 82.08
See application file for complete search history.

(56) References Cited

U.S. PATENT DOCUMENTS

| | | | |
|---|---|---|---|
| 6,864,489 B2 | 3/2005 | Chen et al. | |
| 7,633,071 B2 | 12/2009 | Eustergerling et al. | |
| 8,318,654 B2 | 11/2012 | Hoffman et al. | |
| 9,861,245 B2 | 1/2018 | Farrugia et al. | |
| 10,278,390 B2 | 5/2019 | Rolfe et al. | |
| 11,536,662 B2* | 12/2022 | Poteet | C09D 7/61 |
| 2003/0147925 A1 | 8/2003 | Sawan et al. | |
| 2009/0130157 A1 | 5/2009 | Ylitalo et al. | |
| 2010/0003198 A1 | 1/2010 | Stolmeier et al. | |
| 2010/0172948 A1 | 7/2010 | Redler | |
| 2017/0191020 A1* | 7/2017 | Recht | C12M 41/12 |
| 2017/0273307 A1 | 9/2017 | Narine et al. | |
| 2018/0368648 A1 | 12/2018 | Grossman et al. | |
| 2019/0313641 A1 | 10/2019 | Preda et al. | |
| 2020/0240935 A1* | 7/2020 | Asgari | G01B 15/02 |
| 2021/0278343 A1 | 9/2021 | Rosen et al. | |
| 2021/0388217 A1 | 12/2021 | Gurvich | |
| 2022/0091107 A1* | 3/2022 | Poteet | G01N 33/56911 |
| 2023/0066357 A1* | 3/2023 | Martz | C09D 183/04 |
| 2023/0290102 A1* | 9/2023 | Strydom | H04N 23/74 |

FOREIGN PATENT DOCUMENTS

| | | |
|---|---|---|
| CN | 100471499 C | 3/2009 |
| DK | 3134355 | 7/2018 |
| EP | 0424703 A2 | 5/1991 |
| EP | 1079917 A4 | 3/2001 |
| EP | 2740355 B1 | 8/2018 |
| WO | 2008157323 A1 | 12/2008 |

OTHER PUBLICATIONS

Extended Search Report for European Application No. 21181532.9 dated Oct. 28, 2021, 12 pages.
Extended Search Report for European Application No. 21184084.8 dated Nov. 8, 2021, 12 pages.
Liu Yixian et al: "Synthesis of VO2/Poly(MMA-co-dMEMUABr) antimicrobial/thermochromic dual-functional coatings", Progress in Organic Coatings, Elsevier BV, NL, vol. 142, Feb. 14, 2020 (Feb. 14, 2020), XP086089518, ISSN: 0300-9440, DOI: 10.1016/J.PORGCOAT.2020.105589.
Lukasz M. Porosa et al: "Synthesis, structures and properties of self-assembling quaternary ammonium dansyl fluorescent tags for porous and non-porous surfaces", Journal of Materials Chemistry. B, vol. 2, No. 11, 2014, p. 1509, XP055280973, GB ISSN: 2050-750X, DOI: 10.1039/c3tb21633k.
Shum Rachel L. et al: "UV-Cu rable Surface-Attached Antimicrobial Polymeric Onium Coatings: Designing Effective, Solvent-Resistant Coatings for Plastic Surfaces", ACS Applied Bio Materials, vol. 3, No. 7, Jun. 9, 2020 (Jun. 9, 2020), pp. 4302-4315, XP055851710, us ISSN: 2576-6422, DOI:10.1021/acsabm.0c00359.
Sjollema Jelmer et al: "In vitromethods for the evaluation of antimicrobial surface designs", Acta Biomaterialia, Elsevier, Amsterdam , NL,vol. 70, Feb. 10, 2018 (Feb. 10, 2018), pp. 12-24, XP085367324, ISSN: 1742-7061, DOI: 10.1016/J.ACTBIO.2018.02.001.

\* cited by examiner

ANTIMICROBIAL SURFACE COATING FORMATION, DETECTION, QUANTIFICATION AND REACTIVATION SYSTEMS AND METHODS

CROSS-REFERENCE TO RELATED APPLICATIONS

This Continuation-in-Part (CIP) application claims the benefit of U.S. application Ser. No. 17/071,781 filed Oct. 15, 2020, now U.S. Pat. No. 11,536,662, and entitled "METHODS FOR DETECTING ANTIMICROBIAL SURFACE COATINGS USING FLUORESCENT INDICATORS," which claims the benefit of U.S. Provisional Application No. 63/043,661 filed Jun. 24, 2020 and entitled "METHOD FOR DETECTION AND TAGGING OF ANTIMICROBIAL COATED SURFACES", and U.S. Provisional Application No. 63/062,855 filed Aug. 7, 2020 and entitled "ANTIMICROBIAL COATING CONTAINING FLUORESCENT INDICATOR AND COATING DETECTION METHODS", and further claims the benefit of U.S. Provisional Application No. 63/048,600 filed Jul. 6, 2020 and entitled "METHOD FOR REACTIVATION OF QUATERNARY AMMONIUM TREATED SURFACES," U.S. Provisional Application No. 63/085,735 filed Sep. 30, 2020 and entitled "METHOD OF DETECTION FOR ANTIMICROBIAL COATINGS," U.S. Provisional Application No. 63/085,830 filed Sep. 30, 2020 and entitled "ANTIMICROBIAL SURFACE QUANTIFICATION TECHNIQUES," U.S. Provisional Application No. 63/085,774 filed Sep. 30, 2020 and entitled "METHODS FOR DETECTING ANTIMICROBIAL SURFACE COATINGS USING VOLTAGESENSITIVE DYES," and U.S. Provisional Application No. 63/085,794 filed Sep. 30, 2020 and entitled "METHOD FOR DETECTING ANTIMICROBIAL SURFACE COATINGS USING THERMOCHROMIC COMPOUNDS," the disclosures of which are incorporated by reference herein in their entirety.

TECHNICAL FIELD

Broadly speaking, the present disclosure provides embodiments of detectable antimicrobial surface coatings, as well as methods for forming, applying, detecting, reactivating and quantifying the detectable antimicrobial surface coatings.

BACKGROUND

It is well known that various surfaces can harbor infectious agents such as bacteria and viruses. It is also well known that contact with contaminated surfaces can spread infectious agents. For example, high-contact interior surfaces in a passenger vehicle such as an airliner have a high potential to transfer infectious agents between passengers and/or crew. While these high-contact surfaces can be disinfected during regular cleanings, conventional manual cleaning and sanitization solutions can be time-consuming, labor intensive, expensive, and require the use of potentially harmful and/or irritating chemicals, and even more importantly, can be associated with a relatively low probability of complete disinfection. Further, there remains the potential for infectious agent transfer between regular cleanings.

To alleviate the potential spread of infectious agents, antimicrobial surface coatings have been developed for application on plastics, composites, metal, glass, fabrics, etc. Conventional surface coatings typically include an antimicrobial agent suspended in a carrier substrate and applied as a film-forming composition. While initially effective, film coatings can degrade and wear away over time thereby reducing their efficacy, and therefore must be checked to ensure their continued presence and reapplied, as necessary. In addition, effectiveness requires complete surface area coverage.

One example of antimicrobial agent includes quaternary ammonium compounds (QACs) or "quats," which are commonly used disinfectants in surface coatings due to their ability to neutralize microbes. Quats are cationic surfactants (i.e., positively charged surface-active agents) that impact cell walls and membranes. Their permanent positive charge makes them bind readily to the negatively charged surface of most microbes. That same binding ability can also be used to bond anionic dyes such as bromophenol blue (BPB) to visually detect the presence of antimicrobial coatings via dye bonding and visual inspection. While effective, the process of bonding visible dyes to surface coatings can be destructive. For example, use of visible dyes may leave stains on treated surfaces that must then be removed without removing the surface coating.

Other examples of antimicrobial agents require analytical methods for detection, such as X-ray fluorescence (XRF) spectrometry, X-ray photoelectron spectroscopy (XPS), atomic force microscopy (AFM), and Fourier Transform Infrared Spectroscopy (FTIR), among others. While useful for thin film quantification and characterization, such methods are complex, require particular analyzer devices, and are not sufficiently portable for use in the field.

Therefore, what is needed are methods for detecting the presence of antimicrobial surface coatings in the field without the need for complicated procedures, and without any negative effect on the cosmetic appearance of the coated surface, while having the sensitivity to detect even monolayers of coating.

BRIEF SUMMARY

To achieve the foregoing and other advantages, in a first aspect the present disclosure provides a method for detecting an antimicrobial surface coating including the steps of providing a substrate, applying an anionic agent to a surface of the substrate, allowing the anionic agent to bond to antimicrobial surface coating present on the substrate, removing unbonded anionic agent from the surface of the substrate, subjecting the surface of the substrate to a predetermined process to effect a change in the bonded anionic agent, observing the change in the bonded anionic agent, and verifying, based on the observed change in the bonded anionic agent, the presence of antimicrobial surface coating on the substrate.

In some embodiments, the anionic agent is an anionic thermochromic dye, the predetermined process includes applying heat to the surface of the substrate, and the observed change effected in the bonded anionic thermochromic dye is a visually detectable color change in the boned anionic thermochromic dye.

In some embodiments, the anionic agent is an anionic voltage-sensitive dye, the predetermined process includes applying a voltage to the surface of the substrate, and the observed change effected in the boded anionic voltage-sensitive dye is a change in spectral property of the bonded anionic voltage-sensitive dye.

In some embodiments, the anionic agent is an anionic fluorophoric dye compound, the predetermined process includes irradiating the surface of the substrate with ultraviolet radiation in the 100 nm to 415 nm wavelength range, and the observed change effected in the bonded anionic fluorophoric dye compound is fluorescence in the bonded anionic fluorophoric dye compound.

In some embodiments, the method further includes estimating an efficacy of the antimicrobial surface coating based on the observed change.

In some embodiments, the method includes applying the anionic agent to a predetermined portion of the substrate using an applicator device.

In some embodiments, the applicator device is configured to apply the anionic agent to the surface of the substrate in a predetermined pattern.

In some embodiments, the method includes, based on the observed change in the bonded anionic agent, reactivating the antimicrobial surface coating by applying one or more competing cationic compounds to the surface of the substrate.

In some embodiments, the antimicrobial surface coating includes an antimicrobial cation compound.

In some embodiments, the antimicrobial cation compound includes a quaternary ammonium compound.

In some embodiments, the substrate is located in a passenger cabin of a passenger vehicle.

In some embodiments, the substrate is an element of one of a passenger seat, a passenger suite, a passenger amenity, a control unit, an overhead bin, a lavatory, and a galley.

In another aspect, the present disclosure provides a method for forming a detectable antimicrobial surface coating on a substrate. The method includes the steps of providing a substrate, providing a detectable antimicrobial coating solution including an antimicrobial component configured to covalently bond to the surface of the substrate and a detectable agent configured to effect a change responsive to a predetermined process, applying the detectable antimicrobial coating solution to the surface of the substrate, and allowing the detectable antimicrobial coating solution to dry on the surface of the substrate to form the detectable antimicrobial coating.

In some embodiments, the detectable agent is a thermochromic dye configured to change in color responsive to a change in temperature, and the predetermined process includes applying heat to the substrate having the formed detectable antimicrobial coating.

In some embodiments, the detectable agent is a voltage-sensitive dye configured to change in spectral property responsive to a voltage change, and the predetermined process including applying voltage to the substrate having the formed detectable antimicrobial coating.

Embodiments of the present disclosure may include or more or any combination of the above features and elements.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
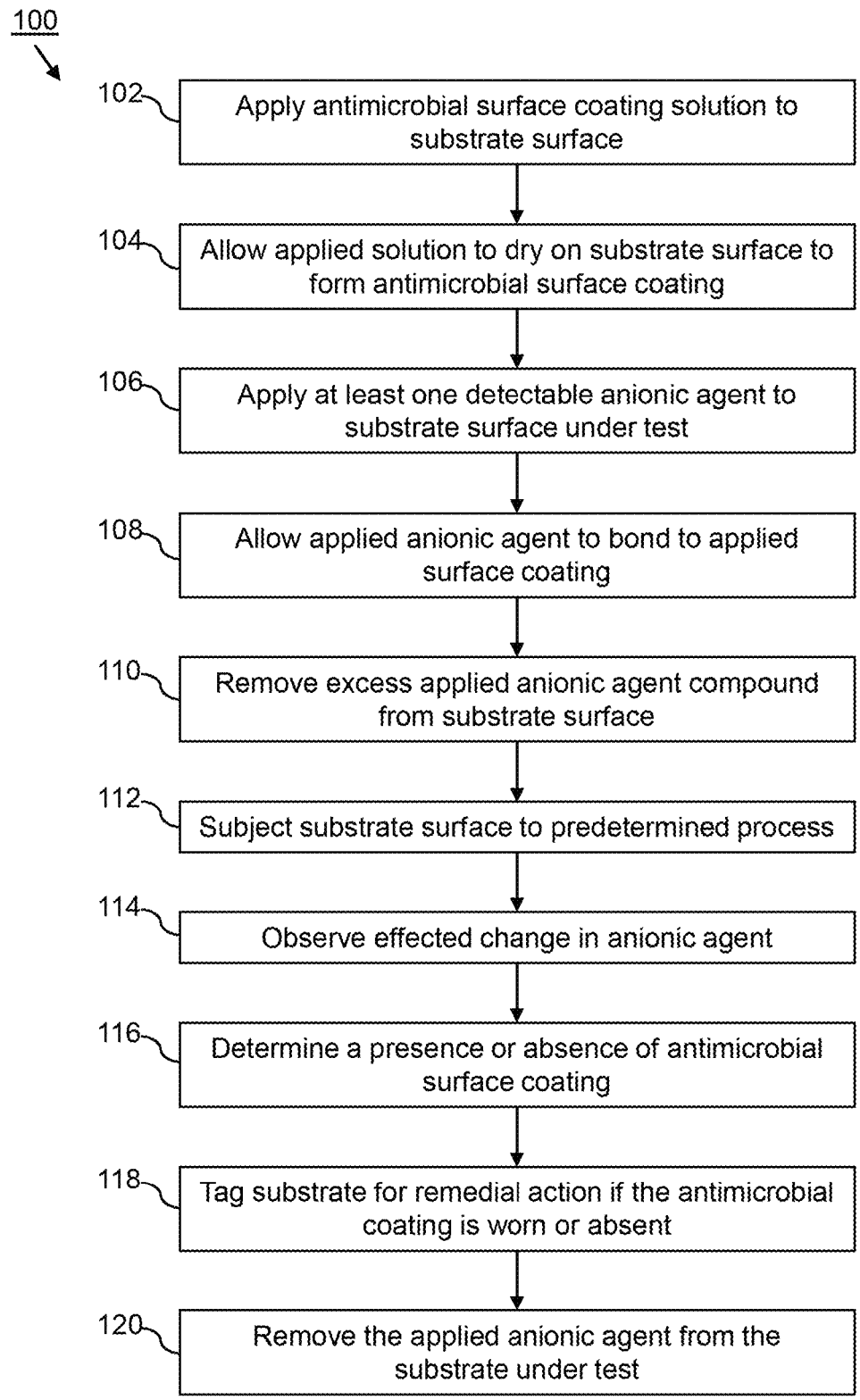
FIG. 1 is a flow diagram illustrating a method for antimicrobial surface coating a substrate and detecting the presence thereof using a detectable indicator, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides embodiments of antimicrobial surface coatings and methods for forming, applying, detecting, reactivating and quantifying antimicrobial surface coatings.

FIG. 1 illustrates a method 100 according to one or more embodiments of the present disclosure. In a step 102, a substrate is provided and an antimicrobial surface coating solution is applied to at least a portion of a surface of the substrate via, for example, a conventional coating process including, but not limited to, electrostatic spray application, dipping, wiping, or other common application methods. In a step 104, the antimicrobial solution may be allowed to stand on the surface of the substrate until dry to form the antimicrobial surface coating, for instance forming a thin-film coating. In some embodiments, the antimicrobial coating solution may be allowed to stand on the surface of the substrate for a predetermined time duration, for example, about 30 minutes to about 6 hours to form the antimicrobial surface coating. Excess (e.g., unbonded) antimicrobial surface coating solution may be removed in one or more optional rinsing steps and the coated substrate may be dried in one or more optional drying steps.

In one or more of the embodiments of the present disclosure, the substrate may be any substrate type, for instance a high-contact substrate located in a passenger cabin of a passenger vehicle such as an aircraft, bus, train, ship, etc. Examples of substrate materials include, but are not limited to, synthetic or natural fabric surfaces, plastics, metals, composites and composite finishes, wood, glass, leather, and other non-cationic substrates. Substrate environments may include, but are not limited to, passenger cabins, crew quarters, lavatories, and galleys. Other environments may include schools, hospitals, public buildings, etc. In the case of passenger vehicles, the substrate may be an element of a passenger seat, a passenger suite, an interior panel, an overhead bin, a door, a wall, a passenger amenity, a control panel, a passenger service unit, a lavatory fixture, galley equipment, and beverage carts, among others. In some embodiments, the substrate may be an element of a mechanism operable for manipulating another element, for example, a handle, lock, latch, switch, control panel, etc.

In one or more embodiments of the present disclosure, the antimicrobial coating solution may include a quaternary ammonium compound (QAC) or "quat," or other static/non-leachable compound (e.g., silane-functionalized QACs, "SiQuat" or "silquat") configured to attract negatively charged microorganisms to the surface where the microorganisms are neutralized. To an extent, QACs and other such static compounds may covalently bond to the substrates to which they are applied, resulting in sustainable layers of antimicrobial coatings that may persist for extended periods of time (e.g., 12 months or longer). In some embodiments, the antimicrobial layers may be of no more than nanometer-level thickness, which means that while such antimicrobial or antiviral coatings are invisible under normal conditions, they may be susceptible to wear or erosion due to physical contact.

In a step 106, a tester, for example a crewmember or maintenance staff, may perform a field assessment of the substrate under test by applying a detectable agent compound to the surface of the substrate. For example, the substrate under test (e.g., or a control portion thereof) may be fully or partially immersed in one or more detectable agent-containing solutions (e.g., a solution of 0.05 to 0.28 volume percent in water or alcohol). Alternatively or additionally, the solution may be applied to the substrate by a process such as spraying, wiping, or via a pen-type applicator for direct application to the surface. Alternatively, application of a detectable compound may occur within minutes of application of the antimicrobial coating, rather than during field assessment. In a step 108, the solution is allowed to stand on the surface of the substrate for a predetermined time duration, for example, about 30 seconds up to about 5 minutes, more preferably about 30 seconds up to about 6 hours or more. In a step 110, the substrate surface may be rinsed to remove excess solution and then dried. In embodiments, solution applied to the substrate under test may bond to QACs or other static antimicrobial compounds. In some embodiments, detectable agents may be applied to a control portion of the substrate under test.

In a step 112, the substrate under test having the applied solution is subjected to a predetermined process configured to effect a change in the detectable agent. In a step 114, the change corresponding to the effected agent in solution is observed. In a step 116, a presence or absence, or coverage, of the antimicrobial surface coating is determined based on the observed change. In an optional additional step 118, the substrate under test may be flagged for further action, for instance reapplication of the antimicrobial surface coating, servicing, or replacement of the associated substrate, element or component. In an optional step 120, the substrate under test may be washed with an aqueous solution containing sufficient concentrations of cationic species, such as cetyltrimethylammonium chloride or ammonium bicarbonate, to remove the detectable agent solution to 'reactivate' the antimicrobial properties of the underlying QACs or coatings.

While the first method 100 is disclosed including both coating formation steps and coating detection and identification steps, it is envisioned and intended that the detection and identification steps can be practiced alone in the case of a substrate under test considered to already include an antimicrobial surface coating or a substrate in which the presence or absence of an antimicrobial surface coating is unknown. For instance, the detection steps can be practiced alone to determine antimicrobial coating presence, coverage area, wear, etc., for the purpose of determining the need for coating, recoating, spot-coating, replacement, etc. Further, the recited rinsing, washing and drying steps can be optional or additional rinsing, washing and drying steps can be performed. Coating application, dye compound application, rinsing, washing and drying procedures may vary depending on the substrate type, coating type, detectable agent compound type, substrate location, and testing environment, among other factors. The foregoing is applicable to the recited method 100 and methods discussed further below.

Figure 2:
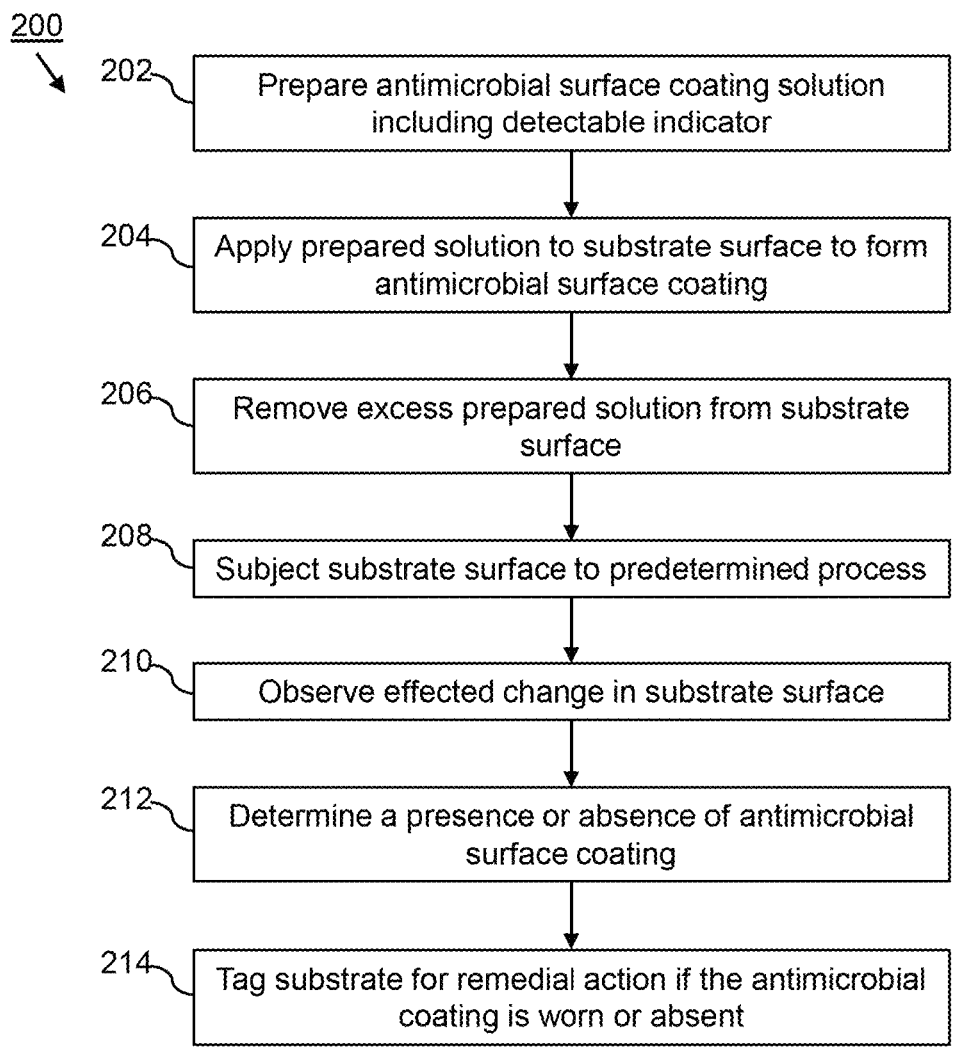
FIG. 2 is a flow diagram illustrating a method for forming an antimicrobial surface coating including a detectable indicator, in accordance with one or more embodiments of the present disclosure.

FIG. 2 illustrates a second method 200 according to the present disclosure. Broadly speaking, the second method 200 includes the steps of preparing an antimicrobial surface coating solution including a detectable fluorescent indicator component, coating a substrate with the prepared solution to form an antimicrobial surface coating, and detecting the presence or absence of the applied antimicrobial surface coating. In some embodiments, the antimicrobial surface coating solution may include an antimicrobial component and a detectable indicator provided as a mixture to be coated on a substrate to impart antimicrobial properties to the coated substrate. In some embodiments, the solution may be a water-based or alcohol-based solution.

In a step 202, an antimicrobial surface coating solution is prepared including at least a quaternary ammonium compound or other static/non-leachable compound and a detectable indicator. In a step 204, the prepared solution is applied to the predetermined substrate and allowed to stand on the surface of the substrate until dry to form the antimicrobial surface coating. In some embodiments, the antimicrobial coating solution may be allowed to stand on the surface of the substrate for a predetermined time duration, for example, at least about 6 hours to form the antimicrobial surface coating. In an optional step 206, the coated substrate may be rinsed or wiped to remove excess surface coating solution and subsequently dried.

In a step 208, the substrate under test having the formed surface coating is subjected to a predetermined process configured to effect a change in the detectable indicator. In a step 210, the effected change is observed. In a step 212, a presence or absence, or coating coverage, of the antimicrobial surface coating is determined based on the observed changed. For example, areas of the substrate that show a change are indicative of bonded antimicrobial surface coating, while areas of the substrate that do not show a change are indicative of uncoated substrate. In some embodiments, the determination step 212 may include comparing an intensity or amount of the change compared to a predetermined threshold value and/or compared to a control area known to be coated or known to lack a coating. In some embodiments, intensity level data for a particular substrate may be saved for comparison against future data to track wear and/or coating performance. In some embodiments, the methods disclosed herein can be used to determine the level of coating wear between areas of a substrate by comparing the level of intensity between different predetermined areas. For example, obtained data can be used to determine frequent touchpoints that may require more frequent recoating, more robust coating, and/or additional coating layers. In an optional additional step 214, the substrate under test may be flagged for further action, for instance reapplication of antimicrobial surface coating, servicing or replacement of the associated substrate, element or component. Methods according to the present disclosure can be used to verify the presence or absence of an antimicrobial coating, for example, to verify the application and quality of the coating during manufacturing, and/or detect wear in the coating during service.

In some embodiments, a detectable indicator according to present disclosure may include fluorescent indicators such as any fluorescent compound capable of absorption in the UV spectrum and emission in the visible spectrum. For example, the fluorescent compound may absorb radiation in the 100-415 nm wavelength range, more preferably in the 300-415 nm wavelength range, and most preferably in the 365-415 nm wavelength range, and emit radiation in the 100-1000 nm wavelength range, and more preferably emit visible light in the 380-740 nm wavelength range. Suitable fluorescent compounds may be transparent in the presence of visible light and uncolored so as not to alter the color and/or transparency of the coating. Suitable fluorescent compounds can include, but are not limited to, commercially available fluorescent dyes, pigments, colorants and brighteners. A specific, non-limiting example of a suitable fluorescent compound can include 5[[4-[bis(2-hydroxyethyl)amino]-6-(4-sulfonatoanilino)-1,3,5-triazin-2-yl]amino]-2-[(E)-2-[4-[[4-[bis(2-hydroxyethyl)amino]-6-(4-sulfonatoanilino)-1,3,5-triazin-2-yl]amino]-2-sulfonatophenyl]ethenyl] benzenesulfonate.

In the case of fluorescent indicators, a surface coating tester according to the present disclosure may apply long-wave ultraviolet (UV) light (e.g., "blacklight") to the treated substrate under test. For example, while the applied fluorophores may be imperceptible under normal visible light (e.g., and therefore may not present as a "stain"), the fluorophores may fluoresce under UV light. For example, areas of the substrate under test where the fluorophores have bonded to antimicrobial QACs fluoresce and therefore are clearly visible under UV light, indicating areas where the antimicrobial coating is present. Similarly, a lack of fluorescence under UV light indicates the absence of an antimicrobial surface coating, for example, attenuated by wear or erosion.

In embodiments, the detectable fluorophoric dye compounds may be anionic dye compounds capable of bonding to QACs or other static antimicrobial coatings, e.g., via sulfonate or carboxylic acid functional groups. For example, anionic dye compounds of $\lambda_{ex}$<500 nm and $\lambda_{em}$>400 nm may be ideally invisible under normal visible light and fluoresce under UV light (e.g., Tetrasodium 4,4'-bis[[4-[bis(2-hydroxyethyl)amino]-6-(4-sulphonatoanilino)-1,3,5-triazin-2-yl]amino]stilbene-2,2'-disulphonate], Disodium; 5-[[4-anilino-6-[2-hydroxyethyl(methyl)amino]-1,3,5-triazin-2-yl]amino]-2-[2-[4-[[4-anilino-6-[2-hydroxyethyl(methyl)amino]-1,3,5-triazin-2-yl]amino]-2-sulfonatophenyl]ethenyl]benzenesulfonate, Disodium 4,4'-bis(4-anilino-6-morpholino-s-triazin-2-ylamino)-2,2'-stilbenedisulfonate, Disodium; 5-[[4-(2-methylanilino)-6-morpholin-4-yl-1,3,5-triazin-2-yl]amino]-2-[2-[4-[[4-(2-methylanilino)-6-morpholin-4-yl-1,3,5-triazin-2-yl]amino]-2-sulfonatophenyl]ethenyl]benzenesulfonate, Hexasodium; 2-[[4-[(3-amino-3-oxopropyl)-(2-hydroxyethyl)amino]-6-[4-[2-[4-[[4-[(3-amino-3-oxopropyl)-(2-hydroxyethyl)amino]-6-(2,5-disulfonatoanilino)-1,3,5-triazin-2-yl]amino]-2-sulfonatophenyl]ethenyl]-3-sulfonatoanilino]-1,3,5-triazin-2-yl]amino]benzene-1,4-disulfonate, and related, as well as fluorescein-SA, Lucifer yellow, sulforhodamine-B or sulforhodamine-101, pyranine, HPTS or HPTS(Lys)$_3$, MPTS, CTR, TSPP, TCPP, PTCA).

Figure 3:
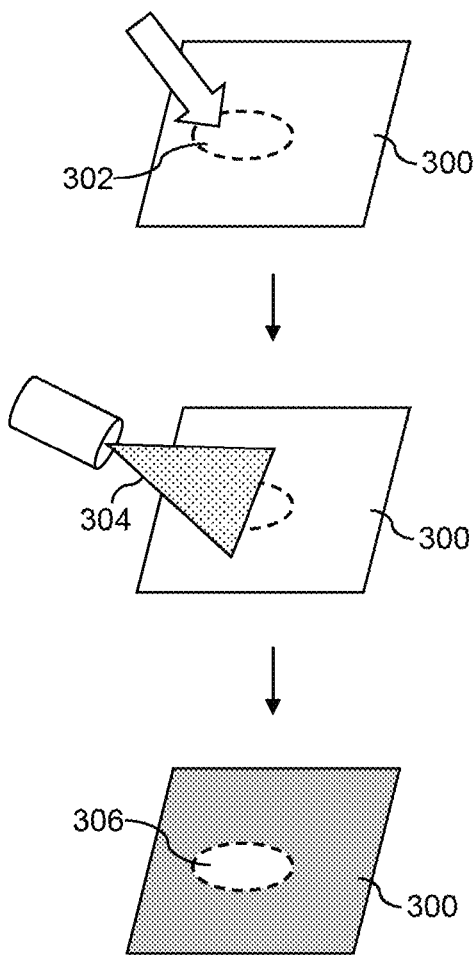
FIG. 3 illustrates schematically the implementation of the disclosed methodologies to determine a presence or absence of an antimicrobial surface coating.

FIG. 3 shows schematically a substrate 300 under test, a detectable fluorescent indicator 302 (e.g., provided as an applied fluorophoric compound according to the first method 100 or as a component of the formed antimicrobial surface coating according to the second method 200), application of the appropriate radiation 304 to be absorbed by the fluorescent indicator 302, and emission of light in the visible spectrum 306 indicating the presence of an antimicrobial surface coating.

In some embodiments, a detectable indicator according to the present disclosure may include thermochromic dyes configured to change color responsive to a change in temperature, such as a color change upon being subjected to a temperature increase. Non-limiting examples may include general indicator leuco dyes, for instance anionic leuco dyes (carboxylic acids, sulfonates) such as 4-(4-dimethylaminophenyl)2,6-diphenylthia-pyrylium p-toluenesulfonate, 4-(4-dimethylaminophenyl)-2,6-diphenylpyrylium-p-toluenesulfonate, and poly[4,4'-isopropylidenediphenyl-co-sulfonyl bis(4-phenyl)carbonate. Solutions can be tuned by selecting dyes for specific colors for aesthetics.

In some embodiments, formed coatings can be detected and inspected after manufacture and during lifetime using the thermochromic dye displaying a color change to verify coating presence, quality, coverage, etc. For example, an antimicrobial coating displaying a first color at a first temperature range (e.g., at or near ambient temperature) may display a second color at a second color range (e.g., elevated temperature). The surface temperature may be increased using, for example, a handheld heat gun for field testing. Some dyes may be capable of multiple color changes at different predetermined intervals. As such, a substrate coating may display a first color during regular use and a second color under test.

In some embodiments, the presence of a cationic quaternary ammonium compound in an antimicrobial coating can be used to temporarily bond the anionic thermochromic dye to surface inspect the substrate. In some embodiments, the method includes applying a thermochromic dye in solution to the substrate under test, permitting the dye to bond, removing excess solution, drying the substrate, and applying heat to the substrate as discussed above to determine coating presence, quality, coverage, etc. After inspection the thermochromic dye can be removed to 'reactivate' the surface coating.

In some embodiments, the detectable indicator may include a voltage-sensitive dye (i.e., potentiometric dye). Voltage-sensitive dyes suitable for use in the antimicrobial solutions according to the present disclosure can include those dyes that can change their spectral properties in response to voltage changes, sense voltage with high speed and sensitivity, and exhibit potential-dependent changes accompanied by a fluorescent change. Non-limiting examples of voltage-sensitive dyes include RH155 ((4,4'-bis(1-(4-sulfophenyl-3-methylpyrazole-5-one)mesophenyl-pentamethineoxonol), RH 237 ((N-(4-Sulfobutyl)-4-(6-(4-(Dibutylamino)phenyl)hexatrienyl)Pyridinium), di-4-ANEPPS (Pyridinium, 4-(2-(6-(dibutylamino)-2-naphthalenyl)ethenyl)-1-(3-sulfopropyl)-, hydroxide), and di-8-ANEPPS (Pyridinium, 4-[2-[6-(dioctylamino)-2-naphthalenyl]ethenyl]-1-(3-sulfopropyl)-). Preferable dyes absorb out of the visible spectrum (e.g., absorb in the UV spectrum below 400 nm) and produce a color in the visible spectrum (e.g., between 400-700 nm). Dyes which absorb in the visible spectrum to produce a first color and excite to second color can be color-matched to the substrate. Solutions can be tuned by selecting dyes for specific colors/wavelengths for aesthetics.

In some embodiments, formed coatings can be detected and inspected after manufacture and during lifetime using the voltage-sensitive dye to verify coating presence, quality, coverage, etc. For example, a handheld electrostatic generator such as the type used in an electrostatic sprayer can be used to induce a charge on the surface of the coated substrate to effect a color change in the coating.

The antimicrobial surface coating prevents the accumulation of microbes on the surface, at some level of efficacy. As the surface is used, the coating may be gradually worn from the surface and such wear may reduce an efficacy of the coating. When the coating reaches a predetermined efficacy threshold level, it is desirable to apply a new coating and the detectable indicator can be used to produce a density map which corresponds to the presence of the coating. For example, in the case of color-changing indicators, a meter (e.g., a color meter) may be used to probe one or more regions of the surface. The meter may then return one or more of density values and/or a Yes/No coating exists value. In the case of fluorescent indicators, wear may be quantifiable as a reduction in luminosity of the fluorescent indicators under a wavelength of light. As luminosity of the fluorescent indicators may be reduced over time, the efficacy of the coating may be negatively correlated to both a wear associated with the surface and a time since the fluorescent indicator was applied. Thus, both the efficacy of the coating and the luminosity of the fluorescent indicator are negatively correlated to a wear and a time (e.g., as the fluorescent indicator is worn from the surface, the coating may be similarly worn). A correlation between the efficacy and the luminosity may thus be determined by a model.

Figure 4:
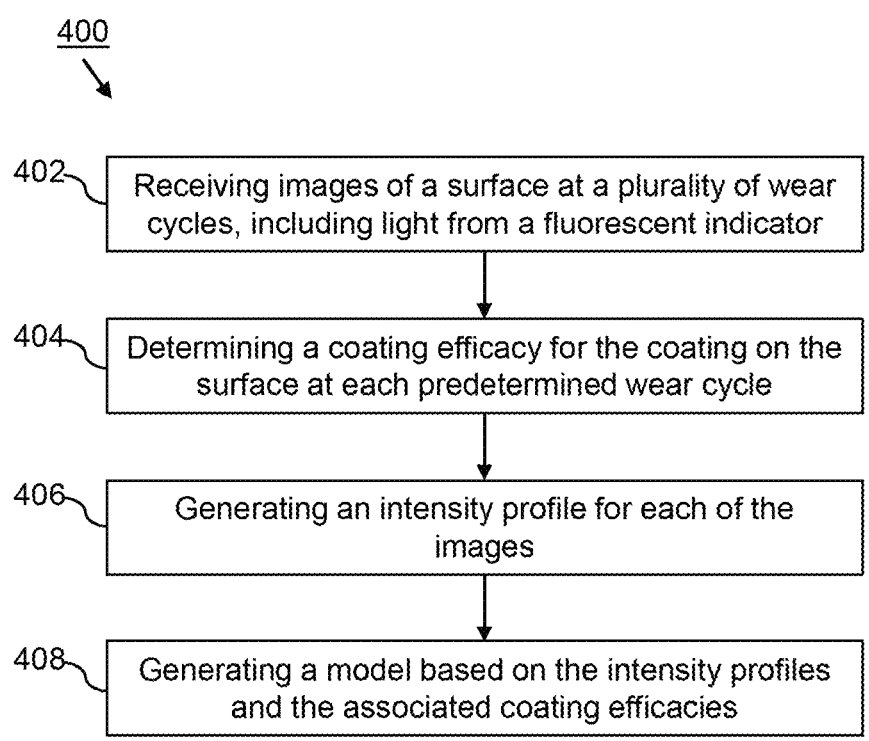
FIG. 4 is a flow diagram illustrating an antimicrobial surface coating quantification method, in accordance with one or more embodiments of the present disclosure.
Figure 5:
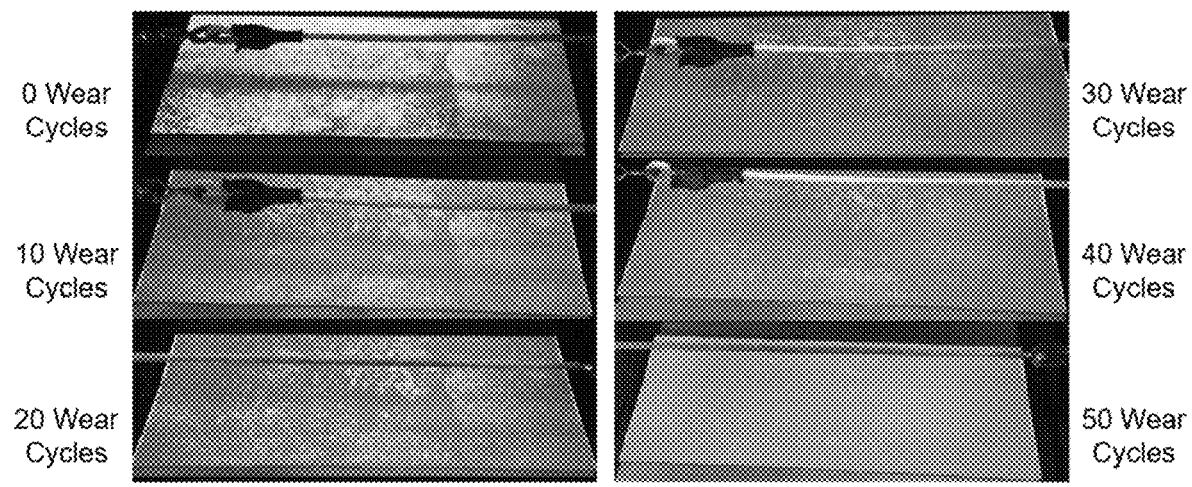
FIG. 5 is a collection of photographs of illumination from a fluorescent indicator at various wear cycles, in accordance with one or more embodiments of the present disclosure.
Figure 6:
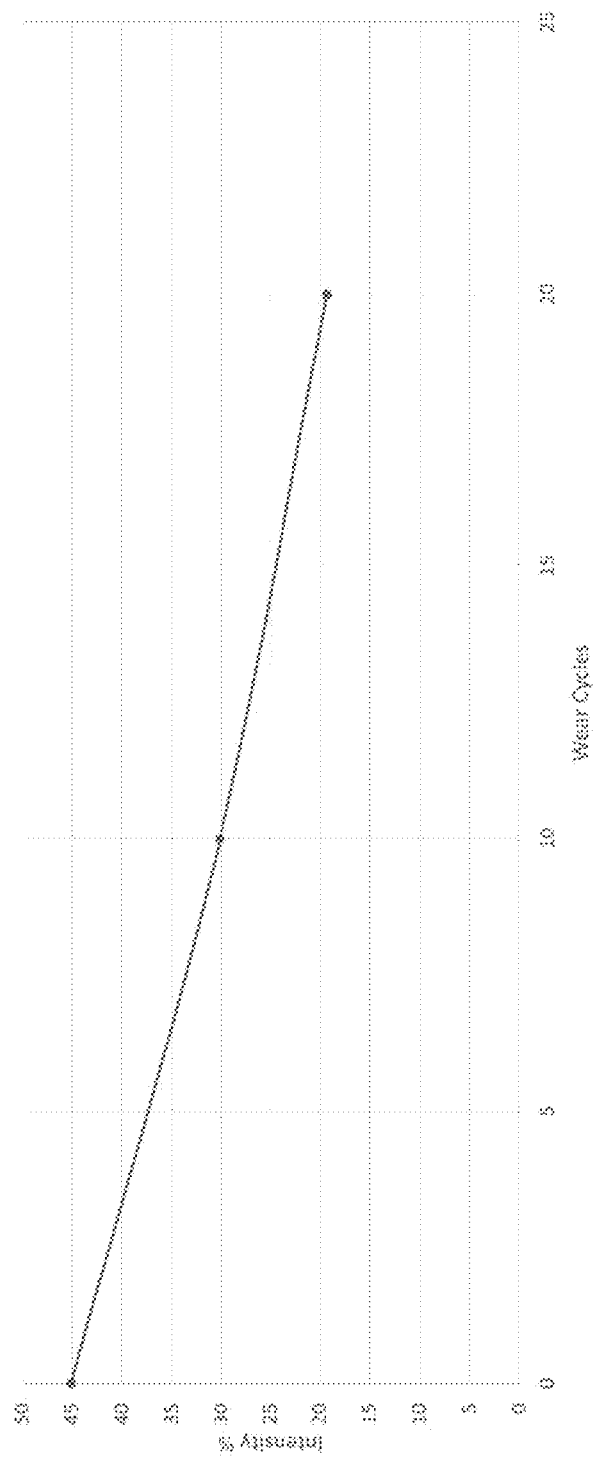
FIG. 6 is a chart illustrating intensity percentages of a portion of the photographs of FIG. 5, in accordance with one or more embodiments of the present disclosure.

FIG. 4 shows a method 400 including in a first step 402 receiving images of a surface at a plurality of wear cycles, for example as shown in FIG. 5, the images including light from a fluorescent indicator. Sample images may be taken at various wear amounts, such as, but not limited to, from 0 wear cycles to 50 wear cycles. In this regard, sample images may be taken at any number of wear cycles and/or at various times after applying the coating (e.g., a week, two weeks, a month, etc.). The method may further include in a second step 404, determining a coating efficacy for the coating on the surface at each of the wear cycles, wherein the coating efficacy may be determined by one or more of liquid chromatography or mass spectrometry. The method may further include in a third step 406, generating an intensity profile for each of the images, for example as shown in FIG. 6. The method may further include in a fourth step 408, generating a model based on the intensity profiles and the associated coating efficacies, and the model may correlate the intensity profiles and the measured coating efficacies.

Figure 7:
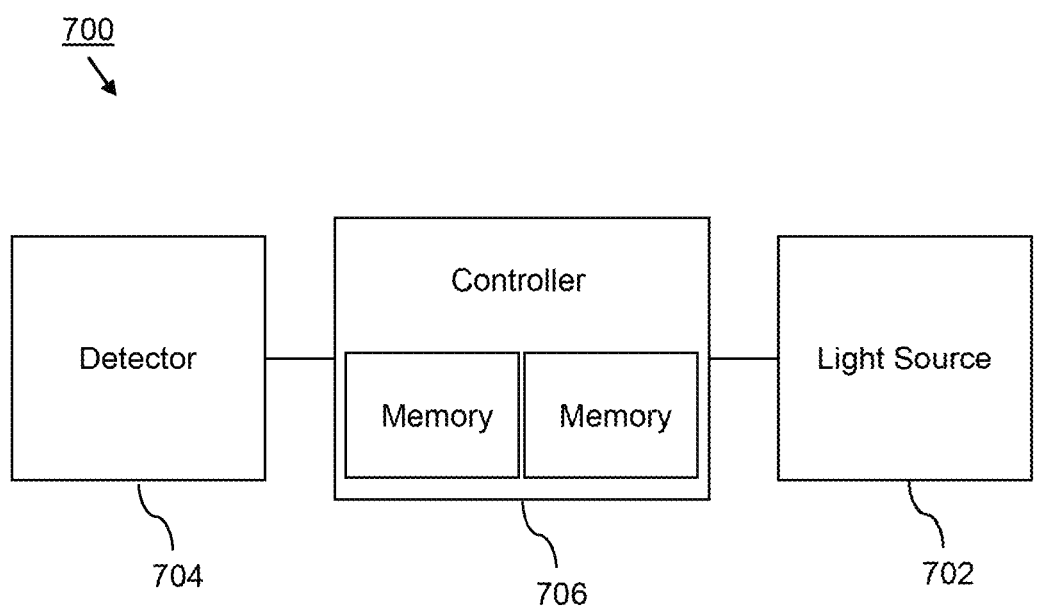
FIG. 7 is a schematic diagram illustrating a system, in accordance with one or more embodiments of the present disclosure.

FIG. 7 illustrates a system 700 according to the present disclosure configured to generate an image and estimate a coating efficacy based on the image. In some embodiments, the system may include a light source 702. The light source 702 may be configured to emit radiation in a wavelength (e.g., from 300 to 400 nm). For example, the system may include a blacklight. Light (e.g., radiation) generated by the light source may be directed to the surface. The radiation from the light source may interact with a fluorescent indicator on the surface, thereby causing the fluorescent indicators to emit light (e.g., visible light in the 400 to 700 nm wavelength range). The wavelength of light generated by the system may be non-destructive. In this regard, a coating on the surface may remain on the surface after being irradiated by light from the light source, which is desirable.

In some embodiments, the system may be configured to generate an image of the emitted light from the fluorescent indicators. The image of the emitted light from the fluorescent indicators may be generated by a detector 704. Such detection may occur by analog or digital means. For example, the detector 704 may include, but is not limited to, an ultra-violet (UV) detector, a charge couple device (CCD) detector, a time delay and integration (TDI) detector, a photomultiplier tube (PMT), an avalanche photodiode (APD), a complementary metal-oxide-semiconductor (CMOS) sensor, or the like. The image may have an associated brightness or intensity (e.g., in lumens). The image may also include a color standard. The image may also be a greyscale image.

In some embodiments, the system may include a controller 706 including a memory and a processor. The controller 706 may be communicatively coupled with the detector 704. In this regard, the image generated by the detector 604 may be provided to the controller 706 of the system and stored in the memory. The controller 706 may also process the image to determine an intensity profile. The memory may also include a model for estimating an antimicrobial coating efficacy based on the received images. The model may correlate various data associated with the image (e.g., a luminosity, a brightness, a color standard, etc.) with an efficacy of a coating. In some embodiments, the model may estimate the efficacy for the coating based on the received image, and based on the estimated efficacy, the system may ensure all surfaces are treated with a sufficient coating. If an insufficient efficacy is estimated, the system may provide a notification to apply an additional coating. Thus, the system may allow for selectively controlling microbial levels on the surface.

The system may also be handheld. In some embodiments, the system may include a power source for powering various components of the system, such as, but not limited to, the controller 706, the detector 704, and the light source 702. The system may also image the surface under ambient lighting conditions or under conditions with no ambient lighting. In some embodiments, one or more of an image correlator, a meter, or a microbe detection sensor may detect whether the antimicrobial compound is on/remains on a surface based on a detected light level.

Figure 8:
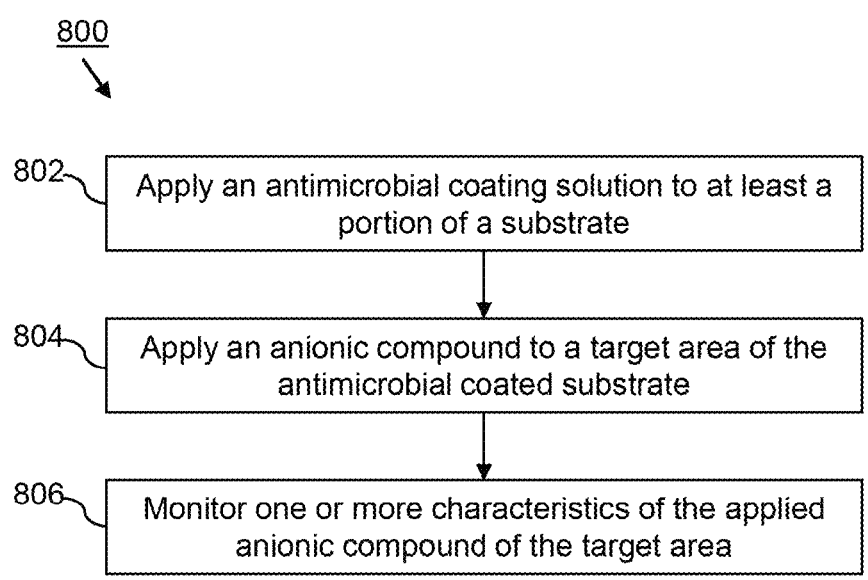
FIG. 8 is a flow diagram illustrating a method for detecting an antimicrobial coating, in accordance with one or more embodiments of the present disclosure.

FIG. 8 illustrates another method 800 according to the present disclosure for detecting an antimicrobial surface coating. In a step 802, and antimicrobial coating solution is applied to a substrate to form an antimicrobial surface coating. In a step 804, an anionic compound is applied to a targeted area of the antimicrobial coated substrate. For example, an anionic compound as described above, for instance one or more fluorescent compounds, thermochromic compounds, photochromic compounds, etc., may be applied to an area of the antimicrobial coated substrate subject to increased wear.

The anionic compound solution may be applied to the targeted area using an applicator device. For example, the applicator device may include a stamp including one or more patterns. For instance, the applicator device may include a self-inking rubber applicator configured to apply the anionic compound to the targeted area. In this regard, the self-inking rubber applicator may be configured to apply the anionic compound to the targeted area based on the pattern of the applicator device. It is noted herein that the one or more patterns of the applicator device may include any pattern including, but not limited to, a logo, brand name or trademarked name, date, symbol, shape, phrase, or the like.

In a step 806, one or more characteristics of the applied anionic compound of the targeted area may be monitored over a predetermined time duration. For example, the applicator device may be configured to apply the anionic compound to the targeted area based on the pattern of the patterning device. For instance, a tester may be configured to monitor one or more characteristics of a portion of a pattern of the anionic compound of the target area. In this regard, a coating loss over time may be monitored by looking at whether any portion of the anionic compound pattern has faded (e.g., the brightness has faded, the color has faded, or the like). It is noted herein the antimicrobial coating solution applied in the step 804 may wear after time/usage. In this regard, there is a need to measure usage and wear of a surface including the antimicrobial coating solution.

Figure 9A:
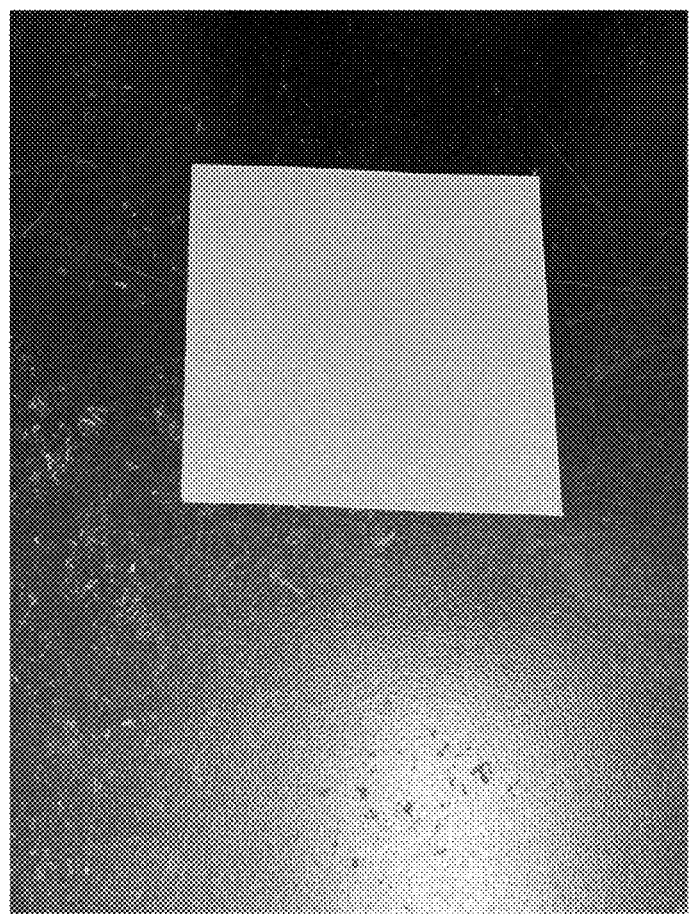
FIG. 9A is a photograph of an anionic compound under normal lighting conditions, in accordance with one or more embodiments of the present disclosure.
Figure 9B:
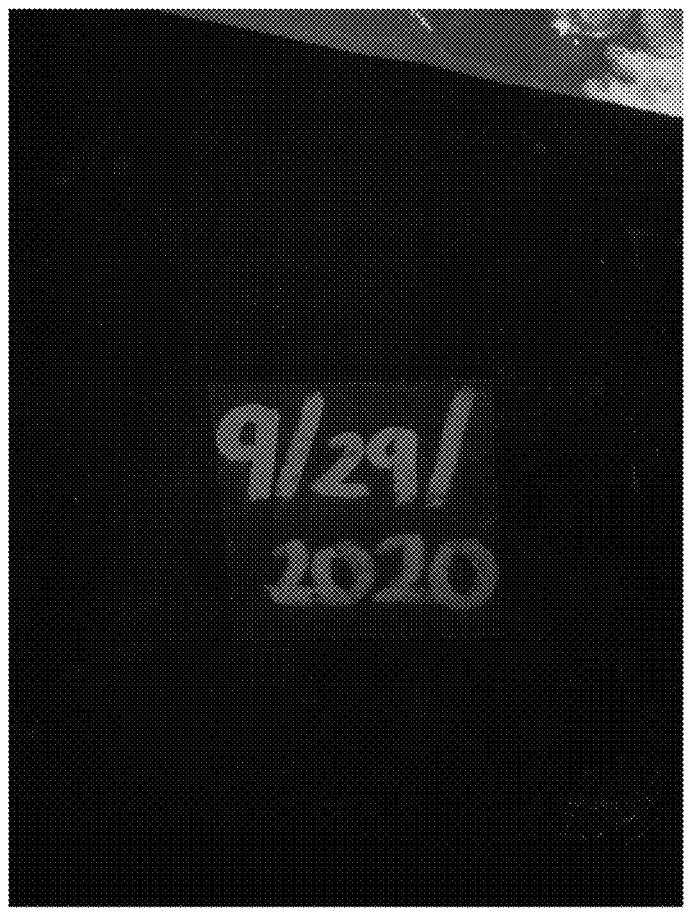
FIG. 9B is a photograph of the anionic compound under a blacklight, in accordance with one or more embodiments of the present disclosure.

The degradation of the anionic compound may be visible under ultraviolet (UV) light, heat, specific wavelengths of light, voltage, or the like, as discussed above. For example, with reference to FIGS. 9A and 9B, in the case of an anionic compound including a fluorescent compound, the anionic compound may be irradiated with UV light. For instance, FIG. 9A shows the coating under normal l or ambient lighting conditions, whereas FIG. 9B shows the presence, or absence, of the antimicrobial surface coating based on the observed fluorescence of the anionic compound on the targeted area when irradiated with UV light (e.g., a blacklight). In this regard, when fluorescence is no longer observed (or the brightness of the fluorescence has diminished), the antimicrobial surface coating may be reapplied to the surface. For example, when the anionic compound includes a thermochromic compound, the anionic compound may be exposed to heat. For instance, the presence or absence of the antimicrobial surface coating is determined based on an observed color change when the anionic compound of the targeted area is exposed to heat. In this regard, when a color change is no longer observed (or the color change has diminished or faded), the antimicrobial surface coating may be reapplied to the surface.

In some embodiments, the anionic compound may be applied to only a portion of the antimicrobial coated surface (as compared to the entire antimicrobial coated surface). In some embodiments, the anionic compound may be applied in a grid pattern or an array of dots by any of several similar methods, on the antimicrobial coated surface, such that the surface as a whole simultaneously retains peak efficacy and fluorescence or other chromic methods (e.g., thermochromic, photochromic, and the like).

The present disclosure further provides a method for reactivating a surface of a substrate treated with an antimicrobial coating. For example, an antimicrobial coating may be deactivated using a detergent. In embodiments, the antimicrobial coating may include an antimicrobial cation attached to the surface, as discussed above. For example, the antimicrobial cation may be any antimicrobial cation such as a quaternary ammonium compound. For example, the quaternary ammonium compound may comprise an alkyl quaternary ammonium trimethoxy silane solution.

In some embodiments, the antimicrobial coating may be deactivated by an anionic detergent. For example, when the anionic detergent is used to clean the surface, the anionic detergent bonds to the antimicrobial cation (e.g., the positively charged antimicrobial cation and the negatively charged anionic detergent form an ionic pair). The formation of the ionic pair prevents the antimicrobial cation from attracting and neutralizing a microbe with a negatively charged surface. The antimicrobial detergent may be any antimicrobial detergent including, but not limited to, sulfonate detergents (e.g., sodium dodecylbenzene sulfonate), and sulfate detergents (e.g., sodium dodecyl sulfate).

In some embodiments, the reactivate the antimicrobial coating, the surface coated with the antimicrobial cation that has been bound and inactivated by an anionic detergent is exposed to a competing cationic compound. The competing cationic compound competes for the anionic detergent, stripping off of the anionic detergent from the antimicrobial cation. Once the anionic detergent has been stripped off of the antimicrobial cation, the anionic detergent is no longer held fast to the surface and can be washed away through further rinsing or by absorption (e.g., by a towel). Because the competing cationic compound is positively charged (e.g., having a positively charged cation), the competing cationic compound does not adhere to the positively charged antimicrobial cation, and does not hold fast to the surface. The competing cationic compound can then be rinsed away (e.g., with water) and/or absorbed similar to the anionic detergent.

In some embodiments, the stripping off of the anionic detergent from the antimicrobial cation is an effect of Le Chatelier's principle, wherein if an equilibrium of a system is disturbed by a stress, the system will compensate to compensate for the stress. In above example, the excess positive charge of the competing cationic compound is compensated by the removal of the anionic detergent from the antimicrobial cation to the competing cationic compound, as the anionic detergent will attempt to neutralize the positive charge of the competing cationic compound.

The magnitude of the effect of the competing cationic compound may be adjusted by changing the concentration of the competing cationic compound or the species of competing cationic compound. For example, raising the concentration of the competing cationic compound in a solution will increase the stripping ability of the competing cationic compound. In another example, changing the species of competing cationic compound to an increased cationic charge will also increase the stripping ability of the cationic compound. For instance, a competing cationic compound having higher charged cations (e.g., $Ca^{2+}$ or $Ce^{3+}$ instead of $NH_4^+$) may increase the stripping ability of the competing cationic compound. The species of competing cationic compound may be any cationic compound known in the art including ammonium bicarbonate.

In embodiments, a detectable compound as discussed above is used to determine the presence of an activated microbial coated surface. The detection compound is an anionic compound that binds to the antimicrobial cation that coats the surface. In some embodiments, the e detectable compound has a detectable color (e.g., a compound comprising a chromophore) and/or fluoresces when exposed to a light source (e.g., a compound comprising a fluorophore). For example, the detection compound may be bromophenol blue. In another example, the detection compound may be pyranine.

The detection compound may be implemented at any step in the reactivation of the antimicrobial coating. For example, the detectable compound may be applied to the antimicrobial cation (e.g., applied to the surface having an antimicrobial coating) before the surface has been washed with an anionic detergent (e.g., to detect if the anionic detergent or general wear has removed or deactivated the antimicrobial surface). In another example, the detectable ion compound may be applied after the anionic detergent has been applied (e.g., to detect if the anionic detergent deactivated the antimicrobial surface). In another example, the detectable compound may be applied after washing by the competing cationic compound (e.g., to detect if the competing cationic compound was successful in reactivating the antimicrobial surface).

Figure 10A:
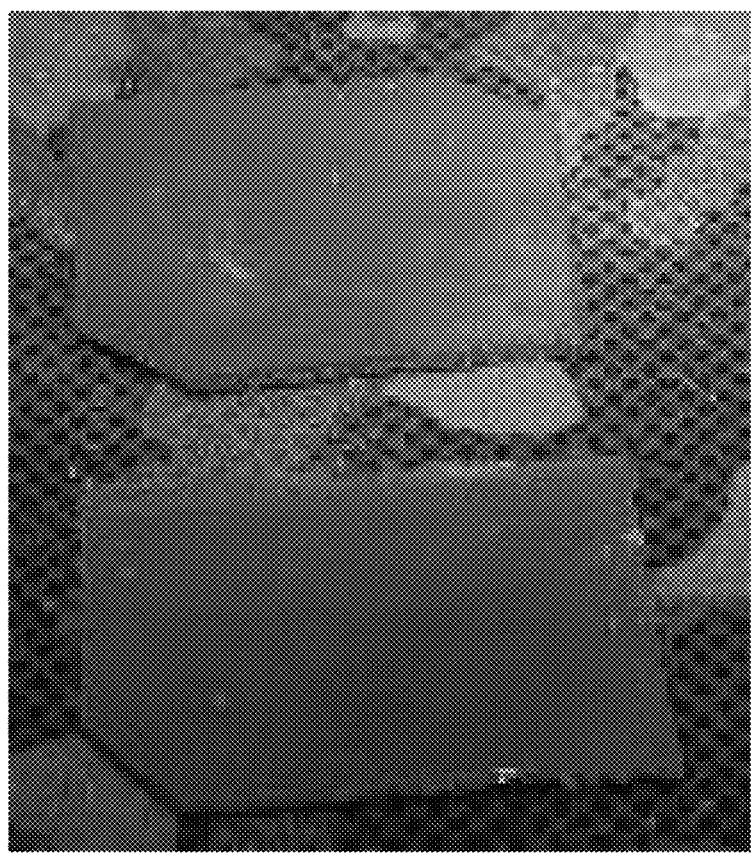
FIG. 10A is a photograph showing two opposing inactivated antimicrobial surfaces of a substrate, in accordance with one or more embodiments of the disclosure.

FIG. 10A is a photo showing two surfaces (e.g., a top surface and a bottom surface of a substrate) coated with an antimicrobial coating, in accordance with one or more embodiments of this disclosure. The surfaces are illuminated with a fluorescent light. The top surface has been coated with a first commercially available antimicrobial cation, whereas the bottom surface has been coated with a second commercially available antimicrobial cation. Both surfaces were then immersed with a glass cleanser, which contains the sulfonate detergent SDBS, for 24 hours. Finally, both surfaces were marked with a spot of pyranine (e.g., from a fluorescent yellow marker) in the upper left corner and rinsed. As shown in FIG. 10A, no spot of pyranine is seen, as the SDBS from the glass cleanser has bound and inactivated the antimicrobial cation, and the pyranine having no cation to bind to, has been rinsed away from the surfaces.

Figure 10B:
FIG. 10B is a photograph showing the same two opposing surfaces of FIG. 10A after reactivation of the antimicrobial cation, in accordance with one or more embodiments of the present disclosure.

The two surfaces were then rinsed in an ammonium bicarbonate solution for 12 hours, and then respotted with pyranine and rinsed. Photos of the two surfaces were retaken as in FIG. 10B. The surfaces now show a fluorescent spot of pyranine in the upper left corner, indicative of the removal of anionic detergent and reactivation of the antimicrobial cation.

Figure 11:
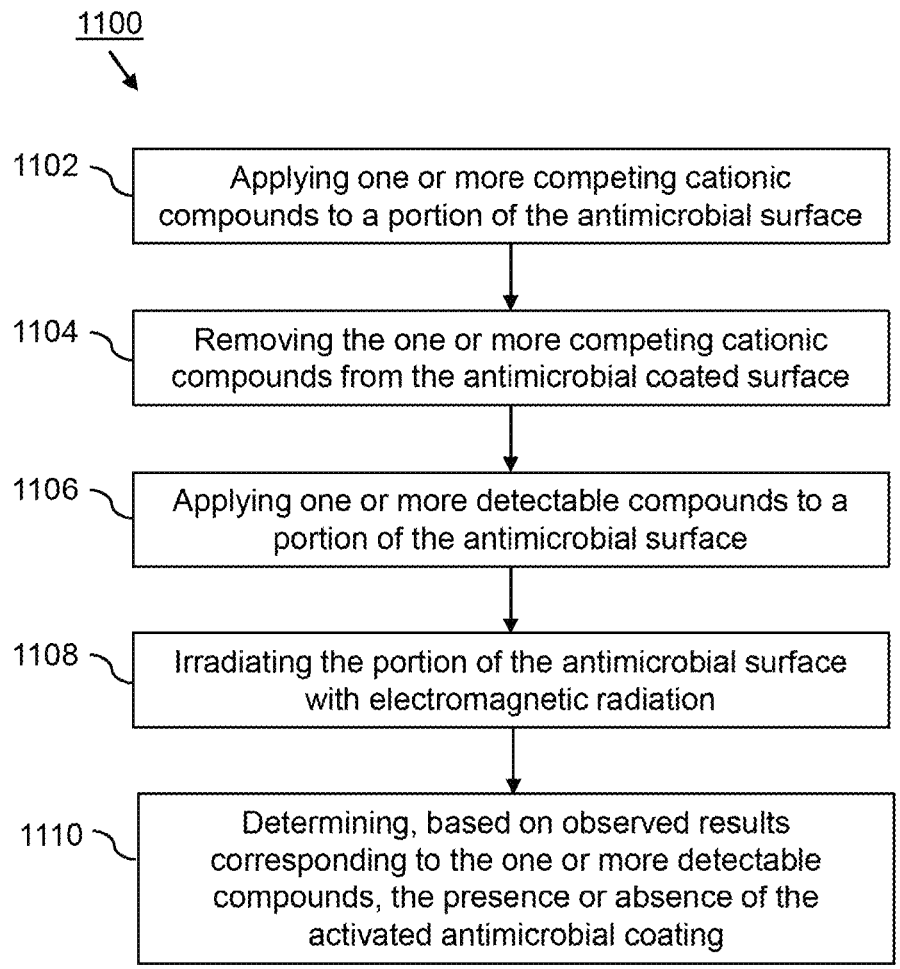
FIG. 11 is a flow diagram illustrating a method for detecting antimicrobial surface coatings, in accordance with one or more embodiments of the present disclosure.

FIG. 11 illustrates a method 1100 for reactivation of an antimicrobial coated surface, in accordance with one or more embodiments of the disclosure. In a first step 1102, the method includes applying one or more competing cationic compounds to the antimicrobial coated surface. In a second step 1104, the method includes removing the one or more competing cationic compounds to the antimicrobial coated surface. In a third step 1106, the method includes applying one or more detectable compounds to a portion of the antimicrobial surface. In a fourth step 1108, the method includes irradiating the portion of the antimicrobial surface with electromagnetic radiation. In a final step 1110, the method includes determining, based on observed results corresponding to the one or more detection compounds, the presence or absence of an activated antimicrobial coating.

Antimicrobial surface coatings according to the present disclosure find widespread application in the field of antimicrobials and may be used to surface treat any substrate benefitting from the advantages of an antimicrobial surface coating.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

What is claimed is:

1. A method for detecting coverage of an antimicrobial surface coating on a substrate, comprising the steps of:
   providing a substrate including an antimicrobial surface coating;
   applying an anionic agent to a surface of the substrate, wherein the anionic agent is an anionic thermochromic dye;
   allowing the anionic agent to bond to the antimicrobial surface coating present on the substrate;

removing unbonded anionic agent from the surface of the substrate;

subjecting the surface of the substrate to a predetermined process to effect a change in the bonded anionic agent, wherein the predetermined process comprises applying heat from an external heat source to the surface of the substrate observing the change in the bonded anionic agent, wherein the change observed in the bonded anionic agent is a visually detectable color change; and determining, based on the observed change in the bonded anionic agent, coverage of the antimicrobial surface coating on the substrate.

2. The method according to claim 1, further comprising the step of, based on the observed change in the bonded anionic agent, determining a need for at least one of reapplying the antimicrobial surface coating, servicing the substrate, and replacing the substrate.

3. The method according to claim 1, further comprising the step of applying the anionic agent to a predetermined portion of the surface of the substrate using an applicator device.

4. The method according to claim 3, wherein the applicator device is configured to apply the anionic agent to the surface of the substrate in a predetermined pattern.

5. The method according to claim 1, further comprising the step of, based on the observed change in the bonded anionic agent, reactivating the antimicrobial surface coating by applying one or more cationic compounds to the surface of the substrate.

6. The method according to claim 5, wherein the one or more cationic compounds comprises a quaternary ammonium compound.

7. The method according to claim 1, wherein the substrate is located in a passenger cabin of a passenger vehicle, and wherein the substrate is part of at least one of a passenger seat, a passenger suite, a passenger amenity, a control unit, an overhead bin, a lavatory, and a galley.

8. A method for forming a detectable antimicrobial surface coating on a substrate, comprising the steps of:

providing a detectable antimicrobial coating solution comprising at least one antimicrobial component configured to covalently bond to a surface of the substrate and a detectable agent configured to effect a change upon being subjected to a predetermined process;

applying the detectable antimicrobial coating solution to the surface of the substrate;

allowing the detectable antimicrobial coating solution to dry on the surface of the substrate to form the detectable antimicrobial coating; and subjecting the formed detectable antimicrobial coating to the predetermined process to observe the change effected in the detectable agent to verify the presence of the formed detectable antimicrobial coating on the surface of the substrate;

wherein:

the detectable agent is a thermochromic dye configured to change color responsive to an increase in temperature;

the predetermined process includes applying heat from an external heat source to the formed detectable antimicrobial coating the observed changed is a color change in the formed detectable antimicrobial coating; and the color change is indicative of coverage of the detectable antimicrobial coating on the surface of the substrate and a possible need for reapplying the antimicrobial coating solution to the surface of the substrate.

* * * * *